US008813054B2

(12) United States Patent
Joisha et al.

(10) Patent No.: US 8,813,054 B2
(45) Date of Patent: Aug. 19, 2014

(54) SEQUENTIAL-CODE OPTIMIZATION OF PARALLEL CODE BASED ON IDENTIFYING SILOED PROGRAM REFERENCES

(75) Inventors: Pramod G. Joisha, Cupertino, CA (US); Robert Samuel Schreiber, Palo Alto, CA (US); Prithviraj Banerjee, Palo Alto, CA (US); Hans Boehm, Palo Alto, CA (US); Dhruva R. Chakrabarti, San Jose, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 603 days.

(21) Appl. No.: 12/966,824

(22) Filed: Dec. 13, 2010

(65) Prior Publication Data

US 2012/0151462 A1 Jun. 14, 2012

(51) Int. Cl.
*G06F 9/45* (2006.01)

(52) U.S. Cl.
USPC .......................................... 717/157

(58) Field of Classification Search
USPC ................. 717/124, 126, 131–132, 136, 140, 717/144–149, 155–161; 713/190; 712/230, 712/239; 714/15, 38.1, 28; 711/147, 154; 707/702, 812
See application file for complete search history.

(56) References Cited

U.S. PATENT DOCUMENTS

| 5,119,483 | A  | * | 6/1992  | Madden et al. ................. 714/15 |
| 5,448,737 | A  |   | 9/1995  | Burke et al. |
| 6,182,284 | B1 | * | 1/2001  | Sreedhar et al. ............. 717/146 |
| 6,286,135 | B1 | * | 9/2001  | Santhanam ................... 717/146 |
| 2006/0005179 | A1 |   | 1/2006 | Kawahara et al. |
| 2010/0153654 | A1 |   | 6/2010 | Vorbach et al. |
| 2010/0299656 | A1 | * | 11/2010 | Shah et al. ..................... 717/132 |
| 2011/0040808 | A1 | * | 2/2011 | Joy et al. ....................... 707/812 |
| 2011/0078511 | A1 | * | 3/2011 | Sinha et al. .................. 714/38.1 |
| 2011/0209127 | A1 | * | 8/2011 | Janczak et al. ............... 717/140 |

OTHER PUBLICATIONS

Srinivasan et al, "Static Single Assignment for Explicitly Parallel Programs" ACM, 1993, pp. 260-272 (herein Srinivasan) <SSA_Srinivasan.pdf>.*
Cytron et al, "Efficiently Computing Static Single Assignment Form and the Control Dependence Graph", ACM, 1991, pp. 451-490 <ssaCytron.pdf>.*
Berman, A.M., Ed. Conference on Object-Oriented Programming, Systems, Languages and Applications (Nov. 1999).
Bristow, G., Drey, C., Edwards, B., and Riddle, W. Anomaly Detection in Concurrent Programs. In Proc. International Conference on Software Engineering (Sep. 1979), pp. 265-273.
Callahan, D., and Subhlok, J. Static Analysis of Low-level Synchronization. In Proc. ACM Workshop on Parallel and Distributed Debugging (May 1988), pp. 100-111.
Choi, J.-D., Gupta, M., Sreedhar, V. C., and Midkiff, S. P. Escape Analysis for Java. In Berman [4], pp. 1-19.
Duesterwald, E., and Soffa, M. L. Concurrency Analysis in the Presence of Procedures Using a Data-Flow Framework. In Proc. Symposium on Testing, Analysis and Verification (Oct. 1991), pp. 36-48.

(Continued)

*Primary Examiner* — Tuan A Vu

(57) ABSTRACT

A parallel-code optimization system includes a siloed program reference-identifier and an intermediate representation (IR) updater. The siloed program reference identifier determines siloed program references in parallel code, wherein siloed program references are free of cross-thread interference. The IR updater modifies data-flow abstractions based on the identified siloed program references.

17 Claims, 4 Drawing Sheets

(56) References Cited

OTHER PUBLICATIONS

Heffner, K., Tarditi, D., and Smith, M. D. Extending Object-Oriented Optimizations for Concurrent Programs. In Proc. International Conference on Parallel Architectures and Compilation Techniques (Sep. 2007), pp. 119-129.

Li, Z., Yew, P.-C., Chatterjee, S., Huang, C.-H., Sadayappan, P., and Sehr, D. C., Eds. International Workshop on Languages and Compilers for Parallel Computing (Aug. 1997), vol. 1366 of Lecture Notes in Computer Science, Springer.

The IEEE and the Open Group. IEEE Standard 1003.1, 2004.

OpenMP Architecture Review Board. OpenMP Application Program Interface, version 3.0 ed., May 2008.

C Standard ISO/IEC 9899. At http://www.open-std.org/JTC1/.

Chugh, Ravi, Jan W. Voung, Ranjit Jhala, and Sorin Lerner, "Dataflow Analysis for Concurrent Programs using Datarace Detection", PLDI'08, Jun. 7-13, 2008, Tucson, Arizona.

Adve, S. V., and Boehm, H.-J. Memory Models: A Case for Rethinking Parallel Languages and Hardware. Communications of the ACM <http://rsim.cs.illinois.edu/Pubs/10-cacm-memory-models.pdf>, 2010.

Adve, S. V., and Gharachorloo, K. Shared Memory Consistency Models: A Tutorial. IEEE Computer 29, 12 (Dec. 1996), 66-76.

Blanchet, B. Escape Analysis for Object-Oriented Languages: Application to Java. In Berman [3], pp. 20-34.

Boehm, H.-J., and Adve, S. V. Foundations of the C++ Concurrency Memory Model. In Proceedings of the ACM SIGPLAN Conference on Programming Language Design and Implementation (Jun. 2008), pp. 68-78.

Bogda, J., and H'O Lzle, U. Removing Unnecessary Synchronization in Java. In Berman [3], pp. 35-46.

Chow, F., Chan, S., Liu, S.-M, Lo, R., and Streich, M. Effective Representation of Aliases and Indirect Memory Operations in SSA Form. In Proceedings of the International Conference on Compiler Construction (Apr. 1996), vol. 1060 of Lecture Notes in Computer Science, Springer-Verlag, pp. 253-267.

Cytron, R., Ferrante, J., Rosen, B. K., and Wegman,M. N. Efficiently Computing Static Single Assignment Form and the Control Dependence Graph. ACM Transactions on Programming Languages and Systems 13, 4 (Oct. 1991), 451-490.

GCC 4.4 Release Series—Changes, New Features, and Fixes. <http://gcc.gnu.org/gcc-4.4/changes.html>.

Srinivasan, H., Hook, J., and Wolfe, M. Static Single Assignment for Explicitly Parallel Programs. In Proc. Symposium on Principles of Programming Languages (Jan. 1993), pp. 260-272.

Taylor, R. N. A General-Purpose Algorithm for Analyzing Concurrent Programs. Communications of the ACM 26, 5 (May 1983), 362-376.

Kam, J. B., and Ullman, J. D. Monotone Data Flow Analysis Frameworks. Acta Informatica 7, 3 (Sep. 1977), 305-317.

Karp, A. H., and Flatt, H. P. Measuring Parallel Processor Performance. Communications of the ACM 33, 5 (May 1990), 539-543.

Knoop, J., and Steffen, B. Parallelism for Free: Efficient and Optimal Bitvector Analyses for Parallel Programs. ACM Transactions on Programming Languages and Systems 18, 3 (May 1996), 268-299.

Lamport, L. How to Make a Multiprocessor Computer That Correctly Executes Multiprocess Programs. IEEE Transactions on Computers C-28, 9 (Sep. 1979), 690-691.

Lee, J., Midkiff, S. P., and Padua, D. A. Concurrent Static Single Assignment Form and Constant Propagation for Explicitly Parallel Programs. In Li et al. [23], pp. 114-130.

Li, L., and Verbrugge, C. A Practical MHP Information Analysis for Concurrent Java Programs. In Proceedings of the International Workshop on Languages and Compilers for Parallel Computing (Sep. 2004), vol. 3602 of Lecture Notes in Computer Science, Springer-Verlag, pp. 194-208.

Adve, S. V., and Hill, M. D. Weak Ordering—A New Definition. In Proc. International Symposium on Computer Architecture (May 1990), pp. 2-14.

Naumovich, G., Avrunin, G. S., and Clarke, L. A. An Efficient Algorithm for Computing MHP Information for Concurrent Java Programs. In Proceedings of the ACM SIGSOFT International Symposium on Foundations of Software Engineering (Sep. 1999), pp. 338-354.

Novillo, D. Memory SSA—A Unified Approach for Sparsely Representing Memory Operations. In Proceedings of the GCC Developers' Summit (Jul. 2007), pp. 97-110.

Novillo, D., Unrau, R., and Schaeffer, J. Concurrent SSA Form in the Presence of Mutual Exclusion. In Proceedings of the International Conference on Parallel Processing (Aug. 1998), IEEE Computer Society Press, pp. 356-364.

Midkiff, S. P., and Padua, D. A. Issues in the Optimization of Parallel Programs. In Proc. International Conference on Parallel Processing (Aug. 1990), vol. II, The Pennsylvania State University Press, pp. 105-113.

Rodriguez, E., Dwyer, M., Flanagan, C., Hatcliff, J., Leavens, G. T., and Robby. Extending JML for Modular Specification and Verification of Multi-threaded Programs. In Proceedings of the European Conference on Object-Oriented Programming (Jul. 2005), vol. 3586 of Lecture Notes in Computer Science, Springer-Verlag, pp. 551-576.

Rugina, R., and Rinard, M. C. Pointer Analysis for Structured Parallel Programs. ACM Transactions on Programming Languages and Systems 25, 1 (Jan. 2003), 70-116.

Sarkar, V. Analysis and Optimization of Explicitly Parallel Programs Using the Parallel Program Graph Representation. In Li et al. [23], pp. 94-113.

Satoh, S., Kusano, K., and Sato, M. Compiler Optimization Techniques for OpenMP Programs. Scientific Programming 9, 2/3 (Aug. 2001), 131-142.

Sevcik, K, J. Program Transformations in Weak Memory Models. PhD thesis, University of Edinburgh, 2008.

Shasha, D., and Snir, M. Efficient and Correct Execution of Parallel Programs that Share Memory. ACM Transactions on Programming Languages and Systems 10, 2 (Apr. 1988), 282-312.

Sura, Z., Fang, X., Wong, C.-L., Midkiff, S. P., Lee, J., and Padua, D. A. Compiler Techniques for High Performance Sequentially Consistent Java Programs. In Proceedings of the ACM SIGPLAN Symposium on Principles and Practices of Parallel Programming (Jun. 2005), pp. 2-13.

Woo, S. C., Ohara, M., Torrie, E., Singh, J. P., and Gupta, A. The SPLASH-2 Programs: Characterization and Methodological Considerations. In Proceedings of the International Symposium on Computer Architecture (Jun. 1995), pp. 24-36.

Zhang, Y., Sreedhar, V. C., Zhu, W., Sarkar, V., and Gao, G. R. Optimized Lock Assignment and Allocation: A Method for Exploiting Concurrency among Critical Sections. CAPSL Technical Memo Revised 65, University of Delaware, Mar. 2007.

Huang, L., Sethuraman, G., and Chapman, B. Parallel Data Flow Analysis for OpenMP Programs. In Proc. International Workshop on OpenMP (Jun. 2007), vol. 4935 of Lecture Notes in Computer Science, Springer, pp. 138-142.

Naumovich, G., and Avrunin, G. S. A Conservative Data Flow Algorithm for Detecting All Pairs of Statements that May Happen in Parallel. In Proc. Symposium on Foundations of Software Engineering (Nov. 1998), pp. 24-34.

Tian, X., Bik, A., Girkar, M., Grey, P., Saito, H., and Su, E. Intel OpenMP C++/Fortran Compiler for Hyper-Threading Technology: Implementation and Performance. Intel Technology Journal 6, 1 (Feb. 2002), 36-46.

Von Praun, C., and Gross, T. R. Static Conflict Analysis for Multi-Threaded Object-Oriented Programs. In Proc. Conference on Programming Language Design and Implementation (Jun. 2003), pp. 338-349.

Von Praun, C., Schneider, F., and Gross, T. R. LoadElimination in the Presence of Side Effects, Concurrency and Precise Exceptions. In Proc. International Workshop on Languages and Compilers for Parallel Computing (Oct. 2003), vol. 2958 of Lecture Notes in Computer Science, Springer, pp. 390-405.

Hendren, L. J., and Nicolau, A. Parallelizing Programs with Recursive Data Structures. IEEE Transactions on Parallel and Distributed Systems 1, 1 (Jan. 1990), 35-47.

(56) References Cited

OTHER PUBLICATIONS

Masticola, S. P., and Ryder, B. G. Non-concurrency Analysis. In Proc. Symposium on Principles and Practices of Parallel Programming (May 1993), pp. 129-138.

Ruf, E. Effective Synchronization Removal for Java. In Proc. Conference on Programming Language Design and Implementation (Jun. 2000), pp. 208-218.

* cited by examiner

SEQUENTIAL-CODE OPTIMIZATION OF PARALLEL CODE BASED ON IDENTIFYING SILOED PROGRAM REFERENCES

BACKGROUND

Software code analysis and optimization is commonly performed to make a computer program work more efficiently or use fewer resources. For example, code is optimized to make a computer program run faster or use less memory or use less power.

Code optimization is often automatically performed by a compiler. Compilers are typically used to transform source code to an executable program, and they often have different phases for performing the transformation. Some of these phases perform code optimization. In many instances, the compiler transforms the source code to an intermediate representation (IR), which is then transformed to an optimized executable program in later phases. Typical transformations in the optimization phases are removal of useless or unreachable code, discovering and propagating constant values, relocation of a computation to a less frequently executed place (e.g., out of a loop), or specializing a computation based on the context.

There is a large body of techniques for analyzing and optimizing sequential code. Sequential code is code that is executed by a single thread, with no other thread simultaneously running. This is opposed to parallel code employing multithreading, which includes multiple threads in a process executed on one or more processors. In multithreading, the threads share a process' resources but are able to execute independently.

Compiler phases may use known transformations to optimize sequential code. These transformations are referred to as optimizations. Unfortunately, much of the known techniques for sequential-code optimization cannot be directly applied on parallel code, which is becoming more popular with the prevalence of multiprocessor computer systems. The inability to directly apply sequential-code optimizations on parallel code is mainly due to the asynchronous nature of parallel code. Conditions that are sufficient for applying sequential-code optimizations on sequential code may not be sufficient for applying sequential-code optimizations on asynchronous code that performs parallel accesses.

Optimizations in modern compilers are usually designed to work on an IR, as described above. Researchers have generally addressed the parallel-program optimization problem by devising analyses and transformations from the ground up, or by adapting existing sequential analyses and transformations. Many of these approaches, which are specifically tailored for parallel code, depend on specialized IRs rather than the conventional IRs commonly used for sequential code. To use these specialized IRs, existing sequential-code compiler phases may have to be re-designed. However, re-designing or modifying an existing compiler phase requires access to the phase's source code, which may not be available.

BRIEF DESCRIPTION OF DRAWINGS

The embodiments of the invention will be described in detail in the following description with reference to the following figures.

DETAILED DESCRIPTION OF EMBODIMENTS

Figure 1:
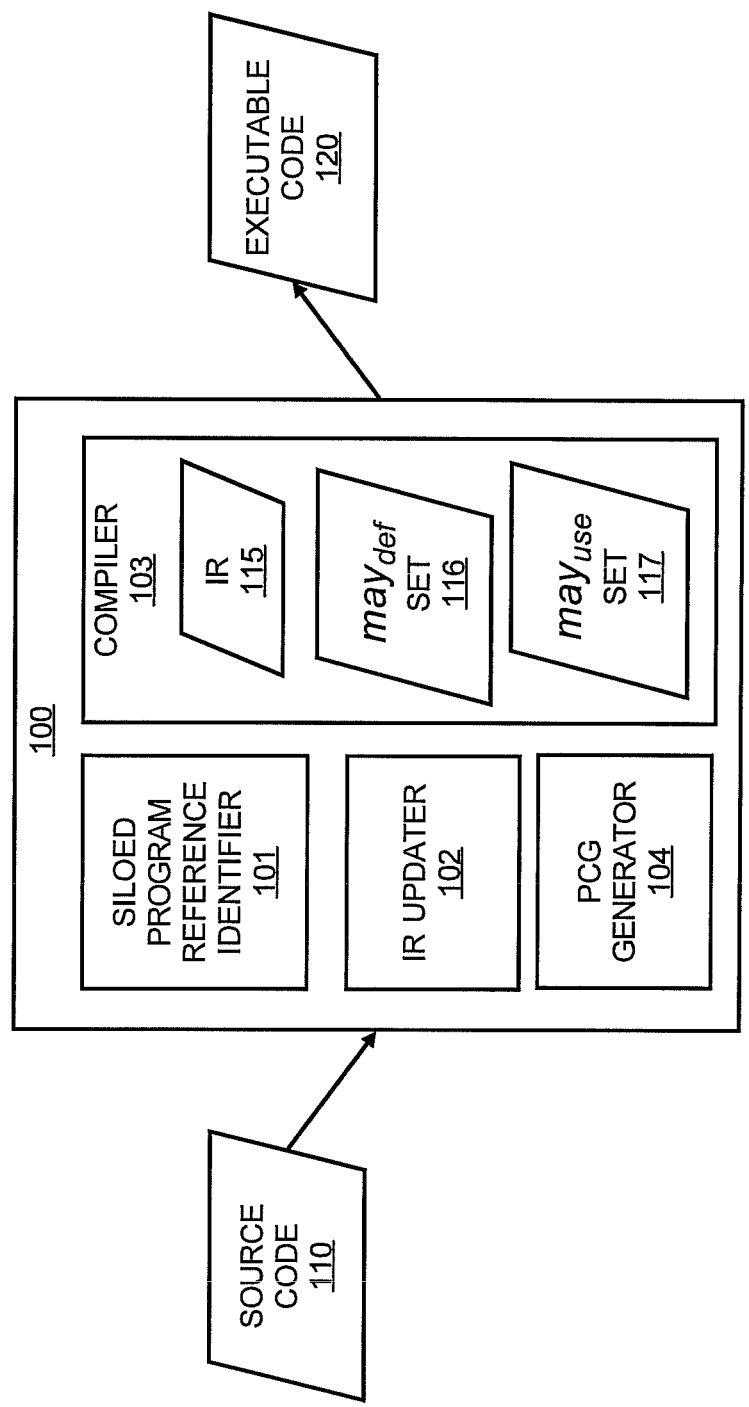
FIG. 1 illustrates a system, according to an embodiment.

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, the embodiments may be used together in various combinations. In some instances, well known methods and structures have not been described in detail so as not to unnecessarily obscure the description of the embodiments.

1. Overview

According to an embodiment, a parallel-code optimization system extends the scope of sequential-code optimizations across synchronization points. A synchronization point is a point in a code path at which is present a synchronization operation. Synchronization operations are system-provided constructs that can be used to prevent data races. The role of synchronization operations in ordering memory operations is described in Adve et al. "Shared Memory Consistency Models: A Tutorial"; IEEE Computer 29, 12 (Dec. 1996), 66-76. A synchronization operation may be a lock acquisition, lock release, thread spawn and so on. The system identifies program references to objects in the parallel code that are, in essence, free of cross-thread interference. Static analysis may be performed to identify these references, which are said to have the siloed property. Program references having the siloed property are called siloed references. Criteria for identifying siloed references are described below.

After identifying the siloed references, the system updates a data-flow abstraction in the IR (e.g., may-definition set or may-use set, also referred to respectively as the may$_{def}$ and may$_{use}$ sets), which causes the siloed references to be transparently exposed to traditional sequential-code transformations that perform optimizations. Then, the system may apply conventional sequential-code transformations on parallel code, based on the IR that is updated using information on siloed references. Examples of conventional sequential-code transformations include dead-code elimination, constant propagation, copy propagation, etc. As described above, examples of the data-flow abstraction may include the may$_{def}$ set and the may$_{use}$ set. The may$_{def}$ set represents all program objects that may be written at a given point in the IR; the may$_{use}$ set represents all program objects that may be read at a given point in the IR.

The system can optimize parallel code without having foreknowledge of existing compiler phases because the system does not require modifying existing compiler phases. The system can thus leverage legacy optimization transforms, which enables a more cost-effective solution by which serial compilers can be used to optimize parallel code.

Some terms and phrases used herein are now described. A "program reference" is a reference in the code to an access of an object. An object is a named storage location. For example, an object may be a variable, an array, or a struct. A program reference is a read or a write of the variable, array, struct and so on. An lvalue is a syntactic expression that refers to an object, such as x and x.f.

As described above, the system identifies references in intraprocedural paths that are free of cross-thread interference. The siloed references can be identified using the Procedural Concurrency Graph (PCG), as described below.

Let P be a control-flow path between two program points. An Ivalue x is "read-siloed in a thread h on P" if once h enters P, no other thread writes an object named by x until h exits P. This definition is best understood by considering an example of an execution interleaving, such as the one now described: $s'_1 s'_2 s_1 s'_3 s'_4 s'_5, s_2 s'_6 s_3 s'_7 s'_8 \ldots s_n s'_m s'_{m+1}$. The boldface symbols $s_1$, $s_2$, $s_3$ and so on until $s_n$ are instructions executed by h, and form the path P. $s_1$ and $s_n$ are also the first and last instructions in P. The other symbols are instructions executed by other threads. If x is read-siloed in h on P, then any write of x by another thread would have to precede $s'_2$ or succeed $s'_m$. Similarly, x is "write-siloed in h on P" if no other thread reads or writes x once h enters P and until it exits P. If these definitions are true for all h, we say that x is "read- or write-siloed on P". P is then a read-siloed or write-siloed path with respect to x. There are numerous points about these definitions. First, they do not mention an occurrence of x in P. An Ivalue x can be read-siloed in h even on a stretch of code free of x, so long as no other thread updates x when h is at any point in this code stretch. Second, write-siloed is a stronger property than read-siloed. In other words, if a reference is write-siloed, then it is read-siloed but not vice versa. If x is write-siloed in h on P, then it is also read-siloed in h on P. Third, an Ivalue y that is read-siloed (write-siloed) on P in all threads has the salient quality that a write (read or write) of y by any thread outside P can only occur when no other thread is within the confines of P. This trait is stronger than read- or write-siloed references within P being just data-race free. It means accesses of y in P, including those involving proper synchronization, are free of cross-thread interference.

The siloed property can be extended to whole procedures. Let stmts(P) be the set of statements in a path P. Then, an Ivalue z is said to be "siloed on a procedure f" if two conditions S1 and S2 are met.

S1: z is write-siloed on every path P in f in which it may be immediately written at a statement s and is not in $\text{may}_{def}(s') \cup \text{may}_{use}(s')$ of any unaffected statement s' in stmts(P)-{s}. An unaffected statement is a statement having fixed $\text{may}_{def}$ and $\text{may}_{use}$ sets.

S2: z is read-siloed on every path P in f in which it may be immediately read at a statement s and is not in $\text{may}_{def}(s')$ of any unaffected statement s' in stmts(P)-{s}.

Siloed references described herein, determined using conditions S1 and S2, are a procedural-level variant of the path-level siloed references described earlier. Generally, a program reference is considered siloed on a procedure if no other thread writes (reads or writes) the object of the reference whenever a thread is executing a path in the procedure in which it reads (writes) the object.

As used herein, cross-thread interference, also referred to herein as interference, is a function of conflict and overlap. Interference is defined as follows. Two procedures f and f' immediately interfere on an Ivalue x if there exists two immediate accesses, m of x in f and m' of an Ivalue x' in f', for which the following conditions C1 and C2 simultaneously hold:

C1: m and m' conflict, i.e., at least one is a write, and x aliases x'; and

C2: m and m' either lie in the overlapping regions of paths in f and f' that are executed by different threads, or there are no unaffected statements whose data-flow abstractions (e.g., $\text{may}_{def}$ and $\text{may}_{use}$ sets) prevent them from ending up in such regions due to a sequentially-sound transformation based on data-flow analysis frameworks. The overlapping regions of two control-flow paths P and P', executed by different threads, are subpaths $p_1$ to $p_2$ in P and $p_3$ to $p_4$ in P'—where $p_1$ through $p_4$ are points—such that $p_1$ abuts $p_3$ and $p_2$ abuts $p_4$ in some execution interleaving. A control-flow path is a path in the program that is executed by a thread. It is a path in an abstraction called the CFG (Control-Flow Graph). A subpath is a portion of a path that extends between two points in the path. Two points in two paths abut if they are performed one after the other in an execution instance.

Suppose $\mathcal{L}$ is the set of all Ivalues that may be accessed in user code. An object is either user-visible or user-invisible, depending on whether there is an Ivalue in $\mathcal{L}$ that refers to it. Not all objects existent in a run are user-visible. For example, an external library state that cannot be referred to by any Ivalue in $\mathcal{L}$ is user-invisible.

An Ivalue is "immediately accessed" in a procedure f if a memory operation m in f reads or writes it. m is then an immediate access.

2. System

FIG. 1 illustrates a code optimization system 100, according to an embodiment. The system 100 includes a siloed program reference identifier 101, an intermediate representation (IR) updater 102, a PCG generator 104, and a compiler 103. The compiler 103 receives source code. The siloed program reference identifier 101, the IR updater 102, and the PCG generator 104 may be included as part of the compiler 103, or may be separate from the compiler 103. Also, the system 100 may be software running on hardware, such as a processor coupled to memory.

The compiler 103 receives source code 110 and may transform the source code to the executable code 120 for a computer program. The source code 110 may be written in a high-level programming language, and the executable code 120 may include object code or machine code that can be executed by one or more processors. The source code may include parallel code with multiple threads that can be executed by multiple processors.

The compiler 103 generates an IR 115 from the source code 110 and performs sequential-node optimizations on the IR 115 to generate an optimized executable code, which is the executable code 120. The IR 115 may include the Static Single Assignment Form (SSA) or some variant of SSA in which every variable is assigned exactly once. Other types of IRs may also be used.

From the IR 115, the siloed program reference identifier 101 identifies siloed program references to objects in the parallel code. Siloed program references may be identified using a PCG built by the PCG generator 104. This includes building a PCG, which describes concurrency and interference relationships between procedures in different threads, and using the PCG to identify siloed program references. Generating the PCG is described in further detail below.

The IR updater 102 modifies certain data-flow abstractions based on the identified siloed program references. These data-flow abstractions identify objects in the IR and may be generated by the compiler 103. In one example, the data-flow abstractions are a $\text{may}_{def}$ set 116 and a $\text{may}_{use}$ set 117. The compiler 103 uses the objects in the $\text{may}_{def}$ set 116 and the $\text{may}_{use}$ set 117 to apply sequential-code optimizations on parallel code. The IR updater 102 removes the identified siloed program references from the $\text{may}_{def}$ set 116 and the $\text{may}_{use}$ set 117. As a result, the compiler 103 can transparently apply code optimizations beyond synchronization points, which would normally be conservatively regarded as being unsafe. The compiler performs the optimizations and generates the executable code 120 based on these optimizations.

3. Example

Figure 2:
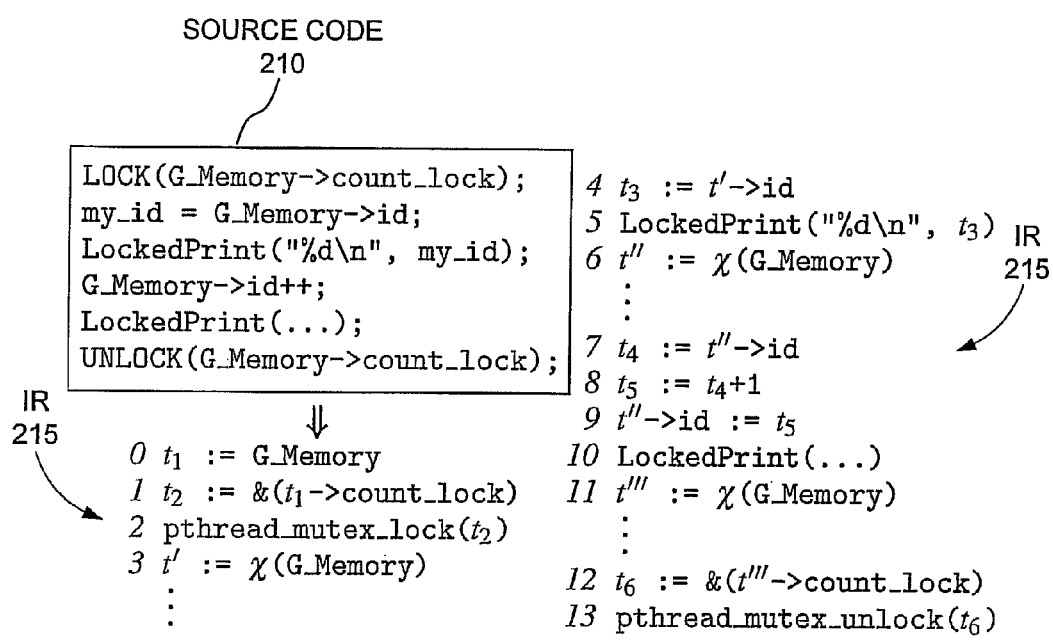
FIG. 2 illustrates an example of an intermediate representation of source code, according to an embodiment.

FIG. 2 shows source code 210, which may be a portion of the source code 110 shown in FIG. 1. FIG. 2 also shows the IR 215, which may be a portion of the IR 115 shown in FIG. 1.

The compiler 103, for example, generates the IR 215 (lines 0-13) from the source code 210.

The source code 210 is a critical section in the source code 110. A critical section is a piece of code that accesses a shared resource that cannot be concurrently accessed by threads. In the source code 210, G Memory->count_lock is a lock pointer. A first thread acquires the lock object targeted by this pointer through the call LOCK (G_Memory->count_lock). A second thread is then blocked from acquiring that lock object until the first thread releases the lock object through the unlock call UNLOCK (G_memory->count_lock).

The IR 215 is a variant of SSA, such as Chow et al.'s HSSA described in "Effective Representation of Aliases and Indirect Memory Operations in SSA Form", in the proceedings of the International Conference on Compiler Construction (Apr. 1996), vol. 1060 of Lecture Notes in Computer Science, Springer, pp. 253-267. In the IR 215, constructs in lines 3, 6, and 11 denote ambiguous definitions and uses. As a result, the lock and unlock calls in lines 2 and 13 have two different lock pointers, which are $t_2$ and $t_6$. Because the may-points-to set for $t_2$ and $t_6$ may include more than one element, the compiler 103 may not be able to determine that $t_2$ and $t_6$ refer to the same lock object. As a result, the compiler 103 may not be able to determine that $t_2$ and $t_6$ are equivalent lock pointers.

The siloed program reference identifier 101 and the IR updater 102 determine that G_Memory is siloed, and that t', t" and t'" in the IR 215 can be replaced by G_Memory. The program reference identifier 101 and the IR updater 102 may enable making these determinations using a PCG, which is described below. Then, the compiler 103 may be able to perform sequential-code optimizations beyond synchronization points.

4. PCG

A PCG describes the concurrency and interference relationships among a program's procedures. Given two procedures, the PCG indicates whether they may execute in parallel, and if so, program objects read or written in one that may be written in the other when the procedures overlap in execution. The PCG may be used to determine when two sections of code can execute in parallel, and whether one of them can access objects that the other updates when the code sections overlap in execution.

A PCG is defined as follows. A PCG is the undirected graph $G_p = (\mapsto_d, E, I_i)$, where $I_i: E \mathcal{F} 2^L$ is the immediate interference function. Nodes in $\mathcal{F}_d$ correspond to the defined procedures in user code. A program comprises parts for which an IR is available, and parts for which it is not. The former is called user code. A procedure invoked in user code is either defined, abstracted or inscrutable. It is defined if its IR is known, abstracted if undefined but with a summary capable of describing its effects at call sites, and inscrutable if undefined and not abstracted. These classes form the sets $\mathcal{F}_d$, $\mathcal{F}_a$ and $\mathcal{F}_{inscr}$ respectively. Together, they constitute the program's call universe. If STMTS(f) is the set of statements in a defined procedure f, then $\mathcal{U} = \cup_{f \in \mathcal{F}_d}$ STMTS(f) is the set of all user-code statements. An $s \in \mathcal{U}$ is either non-call code or a call. The function proc maps a call to the callee in $\mathcal{F}_d \cup \mathcal{F}_a \cup \mathcal{F}_{inscr}$, and non-call code to ♦.

In the PCG, an edge (a, b) means that the execution of a by one thread may overlap with an execution of b by a different thread. Then, $I_i((a, b))$ is the set of Ivalues on which a and b may immediately interfere; this is referred to as the immediate interference set for those two procedures. The function for determining whether procedures immediately interfere on an Ivalue is described above with respect to conditions C1 and C2. Since a could run in parallel with itself, $G_p$ can have self-loops.

According to an embodiment, a two-stage process may be used to build the PCG. The first stage generates an initial PCG from a normalized IR of the input program. The second stage then applies a series of refinements on the PCG by analyzing the IR. This can be done repeatedly until the PCG no longer changes, which is considered the steady state. In the steady state, the PCG may be used to identify (values that can be removed from may$_{def}$ and may$_{use}$ sets.

4.1 The Initial PCG

The process of generating the PCG uses the IRs of defined procedures, the summaries of abstracted procedures, and takes into account inscrutable procedures, which neither have IRs nor summaries.

The first stage appropriately renames all local variables so that no two procedures declare the same local variable name. The program is then converted into an SSA-based IR that takes into consideration aliasing effects and indirect memory operations, such as HSSA. The resulting IR has the property that syntactically identical (values, irrespective of where they occur in the program, name the same set of objects.

The PCG is an undirected graph coupled with a mapping function. Nodes correspond to the defined procedures in the program, and edges signify procedure pairs that may execute in parallel. The mapping is the immediate interference function described above, which includes conditions C1 and C2 for describing conflict and overlap respectively. The immediate interference function associates a set of (values with each edge. These Ivalue sets convey interference information. Their computation is based on the $\overline{R}_i$ and $\overline{W}_i$ sets of a defined procedure, which are respectively the sets of (values immediately read and written in that procedure. No $\overline{R}_i$ and $\overline{W}_i$ sets are maintained for undefined procedures. The reads and writes that happen in undefined procedures are accounted for in the defined procedures that invoke them.

The PCG begins life as a complete graph with self-loops. The immediate interference function is initially set so that its image for an edge is simply the set of all Ivalues that name objects that may be immediately accessed in one procedure and that may be immediately updated in the other procedure. The equations used to generate the initial PCG are now described.

The initial PCG, $G_p^0 = (\mathcal{F}_d, E^0, I_i^0)$, is a complete graph with self-loops, and has an $I_i^0$ that is set so that $$I_i^0((a, b)) = (\overline{R}_i(a) \approx \overline{W}_i(b)) \cup (\overline{W}_i(a) \approx (\overline{R}_i(b) \cup \overline{W}_i(b))) \quad \text{(Equation (1))}$$

for all (a,b) $\in E^0$, where $\approx$ is the set-aliasing operator. Ivalues alias if they name overlapping objects. For instance, if p and q are pointer variables, *p and *q alias if p and q target overlapping objects. By this definition, $_p$ and $_q$ themselves do not alias because they name nonoverlapping objects. Hence, aliasing is not a points-to relation. The predicate x~y is true if the Ivalues x and y may alias. The set-aliasing operator $\approx$ is used to find the may-aliases in the Ivalue sets X and Y:

$$X \approx Y = \{z | \exists x \in X, \exists y \in Y \cdot (x \sim y \wedge (z = x \vee z = y))\},$$

where u≡v is true if u and v are identical Ivalues. As an example, if *p~y, *p≁*q, *q≁~x, then {*p, x}≈{*q, y}={*p, y}.

Equation (1) finds all Ivalues that may satisfy condition C1 (i.e., conflict), and it assumes condition C2 is met for those Ivalues (i.e., there is overlap). In equation (1), the superscript 0 in $I_i^0$ refers to the epoch and the subscript i means that the $I_i^0$ set consists of only immediately accessed Ivalues. The initial PCG is generated at epoch 0; the PCG may then be refined over a sequence of epochs until a steady state is reached.

Also, $R_i(s)$ and $W_i(s)$ are the sets of Ivalues that may be immediately read and immediately written at a statement s. Ivalues that are immediately accessed at the granularity of a defined procedure f can be computed as follows:

$$\overline{R}_i(f) = \cup_{s \in STMTS(f)} R_i(s), \overline{W}_i(f) = \cup_{s \in STMTS(f)} W_i(s).$$

4.2 Refinements

A refinement maps a PCG $G_p^j = (\mathcal{F}_d, E^j, I_i^j)$ to $G_p^{j+1}$, where j is the epoch. Thus, given an initial $G_p^0$, a sequence $G_p^1$, $G_p^2$, ... can be generated by successively applying refinements. All refinements, by definition, possess the following two properties: $E^{j+1} \subseteq E^j$, and $I_i^{j+1}(e) \subseteq I_i^j(e)$ for all $e \in E^{j+1}$. Hence, the PCG sequence converges.

Refinements affect the immediate interference function and may at the same time eliminate edges in the PCG. A refinement is a concurrency type if it may drop edges and if its only effect on the immediate interference function is due to the dropping of edges. A refinement is an interference type if its only effect is on the immediate interference function and if it does not drop edges. The refinements described herein are one of these two types, but there clearly can be other types of refinements.

Described below are two concurrency-type refinements (refinements 1 and 2), and two interference-type refinements (refinements 3 and 4). Refinement 4 relies on the assumption of data-race freedom. The other refinements are formulated using a special classification of a program's invoked procedures. Invoked procedures may be classified into one or more of the following categories: start routines, spawners, spawnees and follow routines.

A procedure is a start routine if it could be the entry point of a spawned thread. It is a spawnee if it could be executed by a spawned thread. It is a spawner if it could create a thread and return with the created thread still running. It is a follow routine if it could be invoked by a thread after that thread returns from a spawner.

Start routines are often easily recognizable. For instance, procedures that may be targeted by the third argument of a pthread_create function call are start routines. Every procedure reachable from a start routine in the call graph may be conservatively marked a spawnee. Therefore, start routines are themselves spawnees.

Procedures that could reach a spawner in the call graph are conservatively also considered spawners. The basis for this recursive definition is any undefined procedure that is a spawner, such as pthread_create. The action of spawning a thread does not necessarily make a procedure a spawner. The procedure is not a spawner if the created threads are not existent on its return. Thus, library procedures that internally create threads and join with them before returning are not considered spawners.

A conservative set of follow routines can be obtained using the following criteria: (1) any procedure whose call site lies on a control-flow path that starts just after a spawner's call site is a follow routine; and (2) procedures reachable from follow routines in the call graph are also follow routines.

If a and b are two procedures such that neither a nor b is a spawnee, then the edge (a, b) can be removed from the PCG; the immediate interference function will no longer have an image at that edge. This is an example of refinement 1.

If a is neither a spawnee, a spawner, nor a follow routine, then every edge incident on a in the PCG can be eliminated. The image of the immediate interference function at those edges can be forced to the empty set. This is refinement 2. Refinements 3 and 4 are described below. One usage embodiment is to apply all refinements at once. The resulting PCG can be used for program optimization, and a new PCG can be constructed from the optimized program. The entire process can then be repeated until no more optimizations are possible. This is one way by which a steady state PCG can be reached. In other embodiments, the refinements may be applied one at a time or in combinations.

4.3 Concurrency-Type Refinements

Refinements 1 and 2 are of the concurrency type. Because their only effect on the immediate interference function is to restrict it to the new edge set $E^{j+1}$, they can be formally stated by just describing their effects on $E^j$. Generally, concurrency-type refinements determine if two procedures can actually occur in parallel. If they will never be executed in parallel, then they can never immediately interfere on an Ivalue. For example, pthread_create is a thread creation point. A procedure completed before the pthread_create call will not execute in parallel with a procedure executed by the new thread.

Refinement 1 may be described as follows:

$$E^{j+1} = E^j - \{(a,b) | a \notin \mathcal{F}_{SPAWNEE} \land b \notin \mathcal{F}_{SPAWNEE}\}.$$

Refinement 1 determines if both nodes, at the jth epoch, are not spawnees. If they are not spawnees, it means that both procedures may only be executed by the main thread because they cannot be executed by a spawned thread. Thus, the procedures do not execute in parallel, and the edge between those procedures can be removed from the PCG.

Refinement 2 may be described as follows:

$$E^{j+1} = E^j - \{(a,b) | a \notin \mathcal{F}_{SPAWNEE} \cup \mathcal{F}_{SPAWNEE} \cup \mathcal{F}_{FOLLOW})\}.$$

In refinement 2, if one of the nodes is not a spawnee (i.e., may only be executed by the main thread), and is not a spawner or a follow, then the edge can be removed.

4.4 Interference-Type Refinements

Interference-type refinements identify (values that may be removed from an immediate interference set, rather than determining whether entire edges can be removed from the PCG. Interference-type refinements determine whether two procedures cannot immediately interfere on an (value. Refinements 3 and 4 are of the interference type. If spawner call sites are unaffected statements, refinement 3 may be described as follows:

$$I_i^{j+1}(e) = I_i^j(e) - \{x | x \notin R_i(s) \cup W_i(s) \forall s \in \text{follow}(\text{spawner}(a))\},$$

where $e \in E^j$, and $a \notin \mathcal{F}_{SPAWNEE} \cup \mathcal{F}_{FOLLOW}$.

Refinement 3 describes a situation in which a procedure a may only be executed by a main thread and is not a follow. If a does not immediately access an (value x after a thread is spawned by it, then x can be safely removed from the immediate interference sets of all the PCG edges incident on a.

The soundness of refinement 3 is further described. Consider a procedure $a \notin \mathcal{F}_{SPAWNEE} \cup \mathcal{F}_{FOLLOW}$. This procedure can only be executed by the main thread. Because $a \notin \mathcal{F}_{FOLLOW}$, it can run concurrently with another procedure only if it is a spawner. Then, all statements executed in it until a spawner call site is reached will not happen in parallel with any statement. Let Z be the set of all (values immediately accessed only in statements preceding spawner call sites, and not elsewhere in a. If no spawned thread accesses an object covered by Z, the refinement trivially holds. So suppose an object covered by a $z \in Z$ is accessed by a spawned thread h. Then the may use and $\text{may}_{def}$ sets of the call site s" that spawns h factor in the read and write of z concurrently performed by h. Now, $\text{may}_{use}(s")$ and $\text{may}_{def}(s")$ are fixed since s" is an unaffected statement. So they always obstruct the unsafe movement of z across s" by a data-flow analysis. Either way, conditions C1 and C2 can never both hold. Hence, the immediate interference between procedure a and its PCG neighbors does not include Z.

Refinement 4 is based on data-race freedom. Consider two procedures a and b that may execute simultaneously. Their $\overline{\text{SYNC}}$ sets are now described. Synchronizations communicate with each other using sync objects. A synchronization may be a call to a synchronizing procedure. Locks, barriers and condition variables are examples of sync objects; these are used in synchronizing-procedure calls. A partial function SYNC gives an Ivalue set covering the user-visible and user-invisible sync objects that may be immediately or transitively accessed at a synchronization. SYNC can be used to find $\overline{\text{SYNC}}$(f), which is the set of Ivalues covering all sync objects that may be accessed by a thread executing procedure f:

$$\overline{\text{SYNC}}(f) = \bigcup_{s \in u_{sync} \cap STMTS(f)} \text{SYNC}(S).$$

If no Ivalue in $\overline{\text{SYNC}}$(a) can alias with an Ivalue in $\overline{\text{SYNC}}$(b), then a and b cannot immediately interfere with each other, provided the no-chain condition specified in the statement of refinement 4 holds. The two procedures can make conflicting accesses to a data object (i.e., non-sync object) only when they do not overlap during execution. If the conflicting accesses were to occur when their executions overlap, an interleaving can be constructed in which the accesses are adjacent. But then, the program has a data race.

If the program is data-race free, then refinement 4 may be described as follows: $I_i^{j+1}(e) = \emptyset$ if $\overline{\text{SYNC}}(a) \approx \overline{\text{SYNC}}(b) = \emptyset$, where $e = (a, b) \in E^j$, provided the "no-chain" condition holds, i.e., there are no procedures $f_1 f_2 \ldots f_n$ (n>2) that satisfy three clauses: (1) $f_1$=a (or b), $f_2$=b (or a) can happen in parallel, (2) for at least one k, $\overline{\text{SYNC}}_i(f_k) \approx \overline{\text{SYNC}}_i(f_{k+1}) \neq \emptyset$ and $f_k, f_{k+1}$ can happen in parallel, and (3) for all other k, a call of $f_k$ precedes a call of $f_{k+1}$ in program order. ($\overline{\text{SYNC}}_i(f)$ is the set of immediately accessed sync objects in f.) Refinement 4 generally describes that if two procedures do not synchronize on common sync objects, the procedures do not interfere in a data-race-free program.

If the no-chain condition is not true, refinement 4 may not hold. This is because a situation such as the following may exist: procedure a shares a sync object with procedure c, and procedure c shares a sync object with procedure b. If such chains do not exist between procedures a and b, refinement 4 is true and the immediate interference set between a and b can be set to ∅.

5. Method

Figure 3:
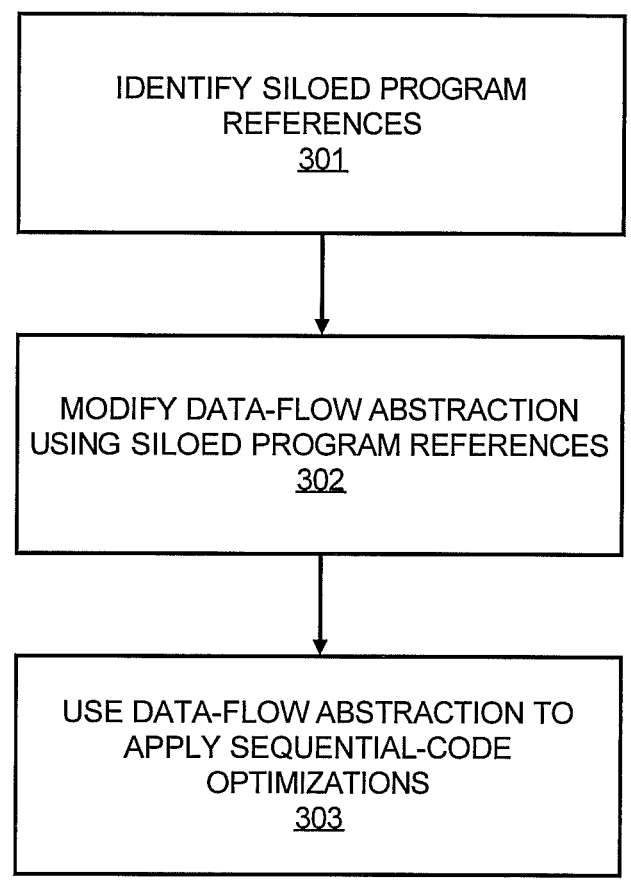
FIG. 3 illustrates a method for optimizing parallel code, according to an embodiment.

FIG. 3 illustrates a method 300 for optimizing parallel code, according to an embodiment. The method 300 is described with respect to the system 100 shown in FIG. 1 by way of example and not limitation. The method 300 may be performed by other systems.

At block 301, the siloed program reference identifier 101 identifies siloed program references in the parallel code. A property of the siloed program references is that they are free of cross-thread interference. A PCG may be used to identify the siloed references.

In one example, a PCG is generated. The PCG may be generated through multiple refinement iterations, such as described above in Section 4. The PCG includes nodes and edges. Each node is a procedure. A node is connected to another node by an edge if the corresponding procedures may execute in parallel; this is also referred to as the may-happen-in-parallel (MHP) relation. Each edge in the PCG is associated with an immediate interference set. For example, for two nodes a and b, the edge between a and b is associated with the set of Ivalues on which a and b immediately interfere. As described above, two procedures f and f' immediately interfere on an (value x if there exists two immediate accesses, m of x in f and m' of an Ivalue x' in f', for which the conditions C1 and C2 are simultaneously met. As stated above, the conditions C1 and C2 describe conflict and overlap, respectively.

The union of all the immediate interference sets for a procedure is determined. For example, if node a is connected to nodes b and c by two edges, then the union of the immediate interference sets for the two edges is determined. This is represented as follows. Let MHP(f) be the set of neighbors of a procedure f in the program's PCG. Then f's overall immediate interference is $$\overline{I}_i(f) = \bigcup_{f' \in MHP(f)} I_i((f,f')).$$

Note that f and f' are two procedures that immediately interfere on an (value. In particular, for every $x \in \overline{I}_i(f)$, there is some f'∈MHP(f) such that f and f' may immediately interfere on x.

The set of all (values used by the procedure represented by the node a is determined. These are all the Ivalues immediately read or written by the procedure. Then, this set is subtracted by the union of all the immediate interference sets for the procedure a to determine the siloed references for a. This is represented as follows:

$$S_i(f) = (\overline{R}_i(f) \cup \overline{W}_i(f)) - \overline{I}_i(f).$$

This procedure is repeated for each node in the PCG to determine the siloed references for each procedure.

At block 302, the IR updater 102 modifies a data-flow abstraction based on the identified siloed program references. This corresponds to removing the siloed program references from the data-flow abstraction, as described below. The data-flow abstraction may be the $\text{may}_{def}$ set 116 and/or the $\text{may}_{use}$ set 117.

Let DU(s) be the set of all user-code Ivalues z for which there is an intraprocedural path from a potential access of z to the statement s, or from s to a potential access of z. Suppose $DU_i(s)$ is a subset of DU(s) that comprises (values for which a potential immediate access of z at a statement s' reaches just before s, or is reached from just after s, by a path P in f in which the unaffected statements among stmts(P)−{s'} do not access z. Then the equation $$\text{may}_{def}(s) \leftarrow (\text{may}_{def}(s) - (DU_i(s) \cap S_i(f))) \cup W(s) \quad \text{(Equation (2))}$$

describes how the $\text{may}_{def}$ set may be updated. In equation (2), W(s) is the set of all user-code (values that may be immediately or transitively written at s by the thread executing s.

Similarly, the equation $$\text{may}_{use}(s) \leftarrow (\text{may}_{use}(s) - (DD_i(s) \cap S_i(f))) \cup R(s) \quad \text{(Equation (3))}$$

describes how the $\text{may}_{use}$ set may be updated. In equation (3), $DD_i(s)$ is a subset of DU(s) that comprises Ivalues for which a potential immediate write of z at a statement s' reaches just before s, or is reached from just after s, by an intraprocedural path P in which the unaffected statements among stmts(P)−{s'} do not access z. Also in equation (3), R (s) is the set of all user-code (values that may be immediately or transitively read at s by the thread executing s.

By using the updated data-flow abstractions in block 303, the scope of sequential optimizations in the compiler 103 is transparently extended beyond synchronization points. For example, as described with respect to FIG. 2, the lock and unlock calls on lines 2 and 13 of the IR 215 have two different lock pointers. By using the modified data-flow abstractions, the compiler 103 can ascertain that the lock pointers are the same by simply applying global-value numbering, a standard sequential-code optimization. The compiler 103 can similarly perform on parallel code other sequential-code optimizations that go beyond synchronization points.

6. Computer Readable Medium

Figure 4:
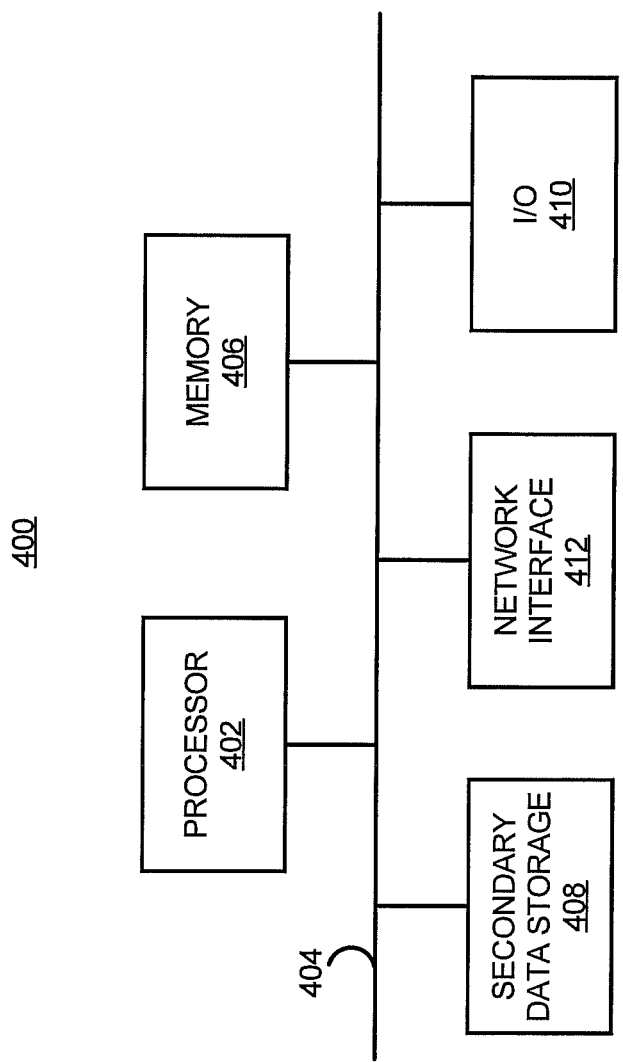
FIG. 4 illustrates a computer system that may be used for the method and system, according to an embodiment.

FIG. 4 shows a computer system 400 that may be used with the embodiments described herein. The computer system 400 represents a generic platform that includes components that may be in a server or other computer system. The computer system 400 may be used as a platform for the system 100. One or more of the components of the system 100 may be software, hardware, or a combination of software and hardware. The components of the system 100 may include machine readable instructions, such as provided in software. The computer system 400 may execute, by a processor or other hardware processing circuit, one or more of the methods, functions and other steps described herein. These methods, functions and other steps may be embodied as machine readable instructions stored on one or more computer readable mediums, which may be non-transitory such as hardware storage devices (e.g., RAM (random access memory), ROM (read only memory), EPROM (erasable programmable ROM), EEPROM (electrically erasable programmable ROM), hard drives, and flash memory).

The computer system 400 includes a processor 402 that may implement or execute software instructions performing some or all of the methods, functions and other steps described herein. Commands and data from the processor 402 are communicated over a communication bus 404. The computer system 400 also includes a main memory 406, such as RAM, where the software and data for processor 402 may reside during runtime, and a secondary data storage 408, which may be non-volatile and stores software and data. The memory and data storage are examples of computer readable mediums.

The computer system 400 may include one or more I/O devices 410, such as a keyboard, a mouse, a display, etc. The computer system 400 may include a network interface 412 for connecting to a network. Other known electronic components may be added or substituted in the computer system 400.

While the embodiments have been described with reference to examples, those skilled in the art will be able to make various modifications to the described embodiments without departing from the scope of the claimed embodiments.

What is claimed is:

1. A parallel-code optimization system to identify siloed program references in parallel code that are free of cross-thread interference and to transparently expose the siloed program references to a compiler, comprising:
   a processor;
   a siloed program reference identifier, executed by the processor, to identify the siloed program references for procedures in parallel code, wherein identifying the siloed program references includes
      determining a Procedural Concurrency Graph (PCG) from the procedures, wherein each node in the PCG represents one of the procedures and an edge connecting two nodes in the PCG represents a possibility of the two procedures executing in parallel, and
      for each procedure, determining a union of immediate interference sets for the procedure based on edges connected to the node representing the procedure; determining a set V of Ivalues for the procedure that includes all Ivalues immediately read or written by the procedure; and subtracting the union of immediate interference sets from V to determine any siloed references for the procedure, wherein the siloed program references are references in the parallel code to accesses of objects and are free of cross-thread interference; and
   an intermediate representation (IR) updater to modify a data-flow abstraction based on the identified siloed program references.

2. The parallel-code optimization system of claim 1, wherein the compiler uses the data-flow abstraction to determine whether to apply sequential-code optimizations beyond a synchronization point in the parallel code.

3. The system of claim 1, wherein the cross-thread interference includes two threads in the parallel code that conflict and overlap.

4. The system of claim 3, wherein the two threads overlap if two control-flow paths P and P', executed by the two threads, include a subpath $p_1$ to $p_2$ in P and a subpath $p_3$ to $p_4$ in P', respectively, where $p_1$ through $p_4$ are points, such that $p_1$ abuts $p_3$, and $p_2$ abuts $p_4$ in some execution interleaving.

5. The system of claim 3, wherein the conflict comprises two accesses by the two threads to the same object and one of the accesses is a write.

6. The system of claim 1, wherein each immediate interference set of Ivalues is the set of Ivalues on which two procedures immediately interfere, and the immediate interference is based on conflict and overlap.

7. The system of claim 1, wherein the IR updater removes the siloed program references from the data-flow abstraction.

8. The system of claim 7, wherein the data-flow abstraction is at least one of a $may_{def}$ set and a $may_{use}$ set.

9. A method for optimizing parallel code system to identify siloed program references in parallel code that are free of cross-thread interference and to transparently expose the siloed program references to a compiler, the method comprising:
   identifying, by a computer, the siloed program references for procedures in the parallel code, wherein the identifying of the siloed program references includes:
      determining a Procedural Concurrency Graph (PCG) from the procedures, wherein each node in the PCG represents one of the procedures and an edge connecting two nodes in the PCG represents a possibility of the two procedures executing in parallel, and
      for each procedure, determining a union of immediate interference sets for the procedure based on edges connected to the node representing the procedure; determining a set V of Ivalues for the procedure that includes all Ivalues immediately read or written by the procedure; and subtracting the union of immediate interference sets from V to determine any siloed references for the procedure, wherein the siloed program references are references in the parallel code to accesses of objects and are free of cross-thread interference; and
   modifying a data-flow abstraction based on the identified siloed program references.

10. The method of claim 9, further comprising:
    using the data-flow abstraction to determine whether to apply sequential-code optimizations beyond a synchronization point in the parallel code.

11. The method of claim 9, wherein the cross-thread interference includes two threads in the parallel code that conflict and overlap.

12. The method of claim 11, wherein the two threads overlap if two control-flow paths P and P', executed by the two threads, include a subpath $p_1$ to $p_2$ in P and a subpath $p_3$ to $p_4$ in P', respectively, where $p_1$ through $p_4$ are points, such that $p_1$ abuts $p_3$, and $p_2$ abuts $p_4$ in an execution interleaving.

13. The method of claim 11, wherein the conflict comprises two accesses by the two threads to the same object and one of the accesses is a write.

14. The method of claim 9, wherein each immediate interference set of lvalues is the set of lvalues on which two procedures immediately interfere, and immediate interference is based on conflict and overlap.

15. The method of claim 9, wherein modifying a data-flow abstraction comprises:
   removing the siloed program references from the data-flow abstraction.

16. The method of claim 15, wherein the data-flow abstraction is at least one of a $may_{def}$ set and a $may_{use}$ set.

17. A non-transitory computer readable medium storing machine readable instructions to identify siloed program references in parallel code that are free of cross-thread interference and to transparently expose the siloed program references to a compiler, that when executed by a computer system, perform a method comprising:
   identifying, by a computer, the siloed program references for procedures in the parallel code, wherein the identifying of the siloed program references includes:
      determining a Procedural Concurrency Graph (PCG) from the procedures, wherein each node in the PCG represents one of the procedures and an edge connecting two nodes in the PCG represents a possibility of the two procedures executing in parallel, and
      for each procedure, determining a union of immediate interference sets for the procedure based on edges connected to the node representing the procedure; determining a set V of lvalues for the procedure that includes all lvalues immediately read or written by the procedure; and subtracting the union of immediate interference sets from V to determine any siloed references for the procedure, wherein the siloed program references are references in the parallel code to accesses of objects and are free of cross-thread interference; and
   modifying a data-flow abstraction based on the identified siloed program references.

* * * * *